United States Patent
MacDonald et al.

(10) Patent No.: US 6,221,262 B1
(45) Date of Patent: Apr. 24, 2001

(54) BALLAST WATER DE-TOXIFICATION TREATMENT SYSTEM FOR SHIPS

(75) Inventors: Robert W. G. MacDonald, Kew; Robert Bull, Sandringham; Douglas F Porter, Beaumaris; Peter Lansell, Kew, all of (AU)

(73) Assignee: Walter J. Archer, Victoria (AU)

( * ) Notice: Subject to any disclaimer, the term of this patent is extended or adjusted under 35 U.S.C. 154(b) by 0 days.

(21) Appl. No.: 09/142,595

(22) PCT Filed: Mar. 11, 1997

(86) PCT No.: PCT/AU97/00146

§ 371 Date: Nov. 18, 1998

§ 102(e) Date: Nov. 18, 1998

(87) PCT Pub. No.: WO97/33833

PCT Pub. Date: Sep. 18, 1997

(30) Foreign Application Priority Data

Mar. 11, 1996 (AU) .................................................. PN8590

(51) Int. Cl.⁷ ........................................................ C02F 1/72
(52) U.S. Cl. ........................... 210/757; 210/764; 252/178; 252/181.6
(58) Field of Search ................................ 252/178, 181.6; 210/757, 764

(56) References Cited

U.S. PATENT DOCUMENTS 3,238,056   3/1966   Pall et al. .
5,578,116 * 11/1996 Chang .................................. 210/764
5,593,636 *  1/1997 Putz ..................................... 210/764

FOREIGN PATENT DOCUMENTS

| 4 216 571 | 11/1993 | (DE) . |
| 0 272 887 A2 | 6/1988 | (EP) . |
| 0 327 491 | 8/1989 | (EP) . |
| 546 850 | 6/1993 | (EP) . |
| 2 238 433 | 11/1990 | (GB) . |
| WO 90/13518 | 11/1990 | (WO) . |

OTHER PUBLICATIONS

Patent Abstract of Japan C 308 p. 16 JP, A, 60–106585 (Katayams Kagaku Kogyo Keniysuho KK) Jun. 12, 1985 (Dec. 6, 1985).
Derwent Abstract of EP 327491 A, Acc. No. 89–220496/198932, Mandrin, C.
Patent Abs. of Japan, Publ. No. 07268893, Nobuhiro, G. (1995).
Boylston, J., "Ballast Water Management for the Control of Nonindigenous Species,", Sname Transaction, Vo. . 104, pp. 391–417 (1996).

* cited by examiner

*Primary Examiner*—David A. Simmons
*Assistant Examiner*—Betsey Morrison Hoey
(74) *Attorney, Agent, or Firm*—Nixon & Vanderhye

(57) ABSTRACT

Method for reducing the number of viable organisms present in ship ballast water wherein the ballast water is treated so as to reduce the concentration of dissolved oxygen and/or carbon dioxide to a level(s) at which a substantial portion of the organisms present cease to remain viable. The treatment comprises adding to the ballast water a suitable amount of an antioxidant.

54 Claims, 1 Drawing Sheet

BALLAST WATER DE-TOXIFICATION TREATMENT SYSTEM FOR SHIPS

This invention relates to a method and compositions for treating ship ballast water so as to reduce the numbers of viable organisms.

BACKGROUND OF THE INVENTION

The transfer of toxic and otherwise undesirable organisms between ports via ship ballast water has been a concern to maritime countries for a number of years. With the emergence of a number of well documented cases of foreign organisms establishing themselves and causing considerable damage to local ecology, the maritime industry is now showing an increased desire to find a solution to the problem. Solutions which have been proposed include the addition of biocides and herbicides to ballast water, heat sterilisation of ballast water, and mid-ocean flushing of ballast tanks. However, each of these proposed solutions have difficulties or requirements which make them impractical or undesirable.

For example, tests conducted on the use of biocides and herbicides show that the treatment of ballast water with these agents would both be expensive and cause unpredictable pollution and destruction to the local ecology upon discharge of the treated ballast. Further, it has been found that when sub-optimal concentrations of the biocides and herbicides are used, the numbers of organisms in the ballast water may actually increase.

Heat sterilisation of ballast water with steam or engine heat would also be expensive and also has the problem of causing accelerated corrosion due to the increased ballast water temperature.

Mid-ocean flushing is expected to be of limited value due to the complex interior surfaces of ballast tanks which tend to ensure considerable ballast water residues when the tanks are emptied, Further, the multiple pumping cycles required are expensive and may cause considerable stress in the ship's hull.

DESCRIPTION OF THE INVENTION

Accordingly, it is an object of the present invention to provide a method for treating ballast water so that ballast water transfer of organisms between ports may be prevented or reduced.

Thus, in a first aspect, the present invention provides a method for reducing the number of viable organisms present in ship ballast water comprising, treating the ballast water so as to reduce the concentration of dissolved oxygen and/or carbon dioxide to a level(s) at which a substantial portion of the organisms present cease to remain viable.

By the term "substantial portion" it is meant that at least 50% of the organisms present in the ballast water cease to remain viable following said treatment. It is, however, preferred that at least 70%, more preferably 95%, of the organisms present in the ballast water cease to remain viable following said treatment. "Organisms" is to be understood as including animals and plants and single and multicellular microorganisms. Thus, the kinds of organisms that might be destroyed by the method of the invention include fish, starfish, crabs, shrimps, bacteria (e.g. cholera, typhoid), dinoflagellates, pest flora species (e.g. Japanese kelp) and various algal blooms (e.g. red algal bloom, blue/green algal bloom) which are commonly found in ballast water.

Preferably, the concentration of dissolved oxygen is reduced to 5 mg $l^{-1}$, more preferably 3 mg $l^{-1}$, or lower. Preferably, the concentration of carbon dioxide is reduced to $\leq 2$ mg $l^{-1}$. Most preferably, the concentrations of both dissolved oxygen and carbon dioxide is reduced to $\leq 2$ mg $l^{-1}$, which ensures that the numbers of viable organisms after 24 hours is negligible.

The treatment of the ballast water may involve the addition of a suitable amount of an anti-oxidant(s). Many anti-oxidant agents may be suitable including sulphites, nitrites and chlorites of metals, organic phosphites and phosphates, and hydroquinones. Further, various oxygen consuming flora and fauna (e.g. yeasts) could be used as anti-oxidant agents. However, it has been found that metal powder(s) are particularly effective in reducing the concentration of dissolved oxygen and carbon dioxide to the required levels. However, to avoid any undesirable side effects upon discharge of the treated ballast, it is most preferred that the treatment involve the addition of iron powder which may actually be beneficial to the local ecology (New Scientist, Dec. 3 1994, pp 32–35).

Iron powder in the preferred particle size range of 0.1 $\mu$m to 200 $\mu$m has been found to reduce the dissolved oxygen and carbon dioxide to the required levels. Preferably, the iron powder may be added to the ballast water with a suspension agent(s) such as xanthan gum, polyacrylic acid or the like. Such suspension agents have been found to keep the iron in suspension longer, which assists in the reduction of dissolved oxygen and carbon dioxide concentrations. In addition, a flocculating agent(s) such as alum (aluminium sulfate) may be added so that the iron will flocculate onto the organisms such that they are surrounded by a high concentration of iron particles thereby causing their rapid demise. Iron oxides such as FeO and $Fe_2O_3$ may also be beneficially added.

The iron powder may be added in amounts greater than 10, more preferably 30, grams $m^{-3}$ of ballast water. Greater amounts may be added to reduce treatment times which may be required for short trips. Xanthan gum may be added in similar amounts, although variation may be required depending on local conditions and required treatment times.

The rate at which the numbers of viable organisms are reduced may depend on the amount of anti-oxidant(s) added, the flocculants, the temperature and the degree of suspension and mixing. These variables may be tailored to suit cost and performance requirements.

As foreshadowed, the treatment of ballast water with iron powder may actually be beneficial to local ecology. The reasoning is that the discharged ballast water will provide a source of iron to the usually iron-deficient sea water. Iron is an important trace element essential for photosynthesis and can therefore be expected to encourage the productivity and healthy growth of the local ecology.

It is, however, possible that some quarantine and/or port authorities may object to the discharge of ballast water including iron. In such circumstances, it will be possible to substantially remove the iron from the treated ballast water by, for example, magnetic means. Two general strategies are presently envisaged.

The first strategy involves removing the iron from the treated ballast water in the ballast tank(s) themselves. This strategy may utilise various types of magnetic apparatus using either electromagnets or permanent magnets. One preferred embodiment comprises a plurality of magnetisable units which can be magnetised by supplying coils surrounding each magnet with a direct current pulse typically supplied by discharging capacitors into the coil. This will have the effect of permanently magnetising the magnet and thereby attracting the iron in the ballast water. By subsequently applying a suitable alternating current to the coils, the magnets can be demagnetised to release all of the trapped iron. Most conveniently, the magnet(s) may be adapted so as to be able to be lowered into the ballast tank(s) through inspection hatches and then removed to dispose or reuse the iron.

The second strategy involves the use of a magnetic "interception" tank situated between the overboard discharge and the ballast tank(s) either before or after the pump. This strategy has the advantage of easier accessibility and maintenance. The interception tank is preferably provided with magnets and coils much like the units described above for use in ballast tanks, only with larger capacity and the lowest pumping resistance possible. The interception tank can be arranged so that the accumulated iron is either discharged to the open sea or diverted to the ships slop tanks as desired.

In a second aspect, the present invention provides a composition for use in the method according to the first aspect. Preferably, the composition comprises:

20–80% (w/w) iron powder,

20–80% (w/w) suspension agent(s), and

5–80% (w/w) flocculating agent(s).

Most preferably, the compositions comprise iron powder, xanthan gum and alum.

In a third aspect, the present invention provides ballast water treated in accordance with the method of the first aspect.

Treatment of the ballast water may be achieved by injecting a dry or water slurry form of the composition according to the second aspect into the inlet of the ballast water pump so that the impellor mixes the composition with the incoming sea water.

It is also envisaged that the method involved in treating ballast water according to the invention, may also be useful for producing sterilised sea water for application in mariculture or aquaculture. Using treated sea water in breeding tanks would avoid the risk of exposing juvenile stocks of fish, crabs etc. to parasites or other undesirable organisms.

Accordingly, in a fourth aspect, the present invention provides a method for reducing the number of viable organisms present in a quantity of sea water comprising, treating the sea water so as to reduce the concentration of dissolved oxygen and/or carbon dioxide to a level(s) at which a substantial portion of the organisms present cease to remain viable.

In a fifth aspect, the present invention provides a quantity of sea water treated in accordance with the method of the fourth aspect.

The preferred features described above in respect to the first and third aspects of the invention, are to be regarded as equally applicable to the invention of the fourth and fifth aspects.

BRIEF DESCRIPTION OF THE DRAWING

The invention will now be described by way of reference to the accompanying FIG. 1 which shows, graphically, the reduction in dissolved oxygen (D.O.) in the sea water following the addition of iron powder (1.5 g at 10.00 am, excess at 12.20 pm).

EXAMPLES

Figure 1:
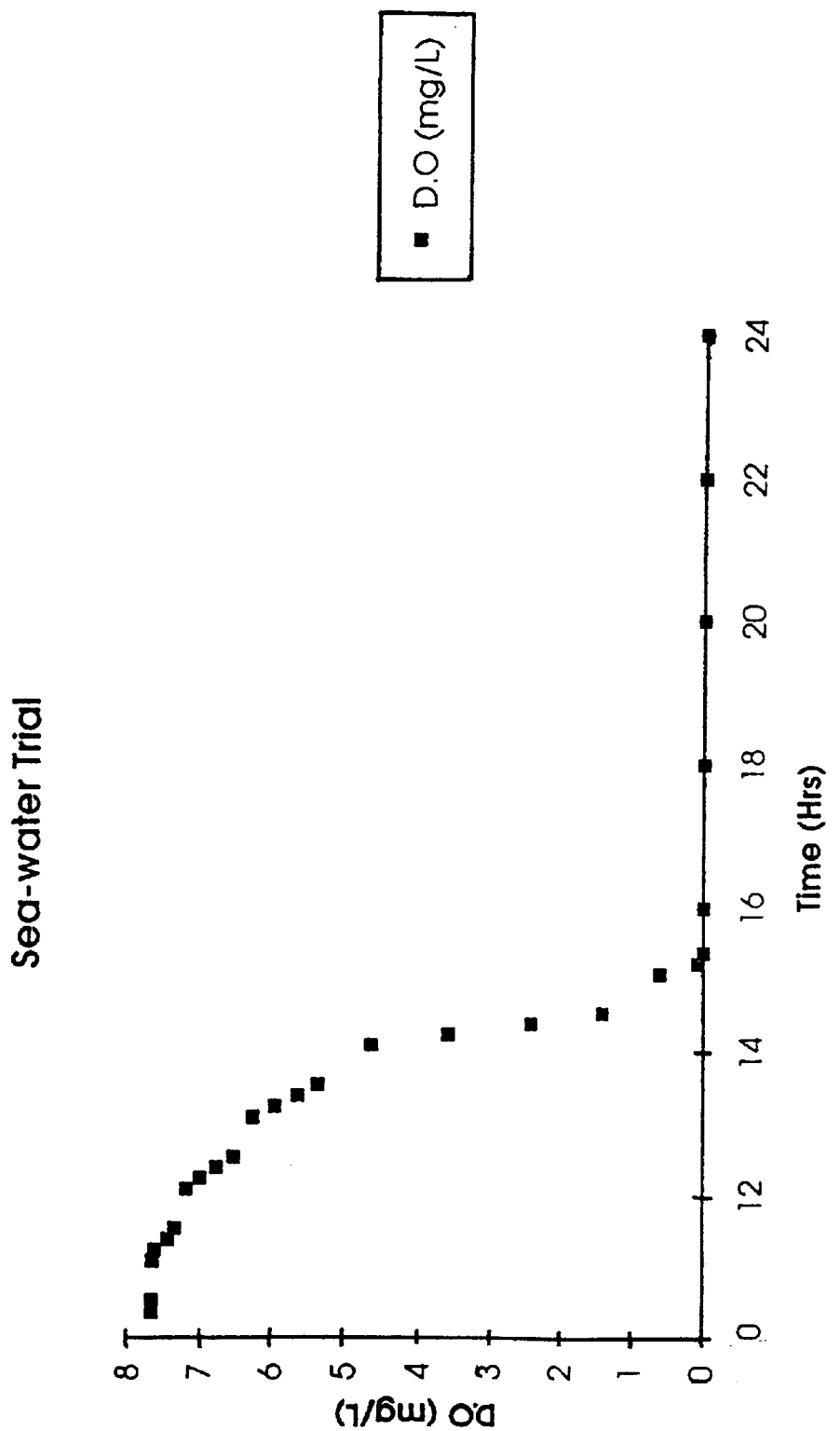

The invention will now be further described by way of the following non-limiting examples.

Example 1

Materials and Methods:

Iron powder (hydrogen reduced) —particle size 40–160 $\mu$m.

Xanthan gum.

Sea water sourced from Williamstown beach (Victoria, Australia).

Ballast water obtained from BHP (Australia).

Dissolved oxygen concentrations were measured using a YSI model 50B dissolved $O_2$ meter.

(A) Sea Water.

Test Procedure:

1. 1 litre of sea water was poured into three jars labelled Jar A, B, C respectively.

2. Jar A was used as a control and contained sea water only.

3. 2×0.28 grams of iron powder and 1×0.28 grams of xanthan gum samples were weighed out.

4. Iron powder was poured into Jar B.

5. A vortex was generated in Jar C by using a Black & Decker™, Slender Blender™ and xanthan gum slowly added with iron powder over a 5 minute period.

6. The dissolved oxygen level for each jar was monitored by gently pouring the sample solution from each jar into Florence flasks A, B, and C respectively and then measuring the oxygen level over a 2 minute period while the water is stirred from time to time. After measuring the level, the sample solution was returned to its jar and sealed to avoid evaporation.

Results:

It was found that the dissolved oxygen level of Jar C had been reduced by more than 7 mg $l^{-1}$ in 19 hours. This low level of oxygen was maintained over a 15 day period.

(B) Ballast Water.

Test Procedure:

Jar E; 0.28 grams of iron powder and xanthan gum was added to 1 liter of ballast water in the manner described above for Jar C.

Jar F; 0.2 grams of iron powder and xanthan gum was added to 1 liter of ballast water.

Jar G; ballast water only.

Results:

It was found that the dissolved oxygen level of Jar E had been reduced by more than 6 mg $l^{-1}$ in 23 hours. The dissolved oxygen in Jar F was reduced by more than 7 mg $l^{-1}$ in 19 hours and has been maintained at 6 mg $l^-$below the level of ballast water over a 15 day period.

(C) Ballast Water.

Test Procedure:

Jar H; 1 liter of ballast water only.

Jar I; 0.21 grams of iron powder was added to 1 liter of ballast water in the manner described above for Jar C.

Jar J; 0.21 grams of iron powder and 0.41 grams of xanthan gum was added to 1 liter of ballast water.

Results:

| Jar | Dissolved $[O_2]$(mg $l^{-1}$) at 0 hrs | Dissolved $[O_2]$(mg $l^{-1}$) after 6 hrs |
|---|---|---|
| H | 9.29 | 9.43 |
| I | 10.38 | 6.47 |
| J | 10.13 | 1.30 |

These results show the level of reduction in the dissolved oxygen concentration that may be achieved after 6 hours following the addition of iron powder. In this time period, the use of 0.21 grams iron powder and 0.41 g xanthan gum reduced the dissolved oxygen level to 1.3 mg $l^{-1}$. This level of dissolved oxygen would be expected to bring about the death of most organisms present in the ballast water sample.

Example 2

Experimentation was conducted by the National Analytical Laboratories (Victoria, Australia) in December 1996.
Materials and Methods:
  Glass vessel of volume greater than 5 l.
  Electric stirrer (variable speed) and a plastic prop.
  Dissolved oxygen probe and meter with data logging capability.
  Cork top covered in Parafilm™ to seal vessel.
  The sea water was added to the glass vessel and the cork set in position (zero head space). The stirrer was activated and the dissolved oxygen content was logged in situ at 15 minute intervals.
Day 1
10.00 Sea water added to vessel, prop activated, dissolved oxygen probe calibrated and set in place.
10.31 Logging of dissolved oxygen commenced and a base value of 7.65 mg $l^{-1}$ established over a 45 minute period.
11.20 1.5 grams of iron powder was added to the vessel.
12.00 A minimal change in dissolved oxygen accompanied by an absence of particulate iron indicated that the iron had been consumed.
12.20 Excess iron powder added to the vessel.
14.00 Prop speed increased.
15.30 0.00 mg $l^{-1}$ dissolved oxygen achieved.
Day2
15.30 0.00 mg $l^{-1}$ dissolved oxygen maintained for 24 hours.
Day 3
15.30 0.00 mg $l^{-1}$ dissolved oxygen maintained for 48 hours.
  FIG. 1 shows, graphically, the reduction in dissolved oxygen (D.O.) in the sea water following the addition of iron powder (1.5 g at 10.00 am, excess at 12.20 pm).

Example 3

Experimentation was also conducted using sea water samples containing shrimp and crabs.
Materials and Methods:
  1.25 l bottles.
  Iron powder (28 grams $l^{-1}$).
  35 grams of iron powder were added to 1.25 l of sea water collected from weed beds at Sandringham, Victoria, Australia. The water temperature was 24° C.
Results:

| Bottle No. | Contents | Life duration |
| --- | --- | --- |
| 1 | Large shrimp | 4 hrs Dead |
| 2 | Medium shrimp | 8 hrs Dead |

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method for reducing the number of viable organisms present in ship ballast water comprising adding to said ballast water a suitable amount of iron powder so as to reduce the concentration of dissolved oxygen and/or carbon dioxide to a level(s) at which a substantial portion of the organisms present cease to remain viable.

2. A method according to claim 1, wherein at least 70% of the organisms present in the ballast water cease to remain viable after said treatment.

3. A method according to claim 1, wherein at least 95% of the organisms present in the ballast water cease to remain viable after said treatment.

4. A method according to claim 1, wherein the concentration of dissolved oxygen is reduced to $\leq 5$ mg $l^{-1}$.

5. A method according to claim 1, wherein the concentration of dissolved oxygen is reduced to $\leq 3$ mg $l^{-1}$.

6. A method according to claim 1, wherein the concentration of dissolved carbon dioxide is reduced to $\leq 2$ mg $l^{-1}$.

7. A method according to claim 1, wherein the concentrations of both dissolved oxygen and carbon dioxide is reduced to $\leq 2$ mg $l^{-1}$.

8. A method according to claim 1, wherein the iron powder is added to the ballast water in combination with a suspension agent(s).

9. A method according to claim 8, wherein the suspension agent(s) is/are xanthan gum and/or polyacrylic acid.

10. A method according to claim 8, wherein the iron powder and suspension agent(s) are added to the ballast water in combination with a flocculating agent(s).

11. A method according to claim 10, wherein the flocculating agent(s) is alum.

12. A method according to claim 1, wherein the iron powder has a particle size in the range of 0.1 µm to 200 µm.

13. A method according to claim 1, wherein the iron powder is added to the ballast water in amounts greater than 10 grams $m^{-3}$ of ballast water.

14. A method according to claim 13, wherein the iron powder is added in amounts greater than 30 grams $m^{-3}$ of ballast water.

15. A method according to claim 1, wherein following said treatment, the iron is removed from the treated ballast water.

16. A method according to claim 15, wherein the iron is removed from the treated ballast water by magnetic means.

17. Ballast water treated in accordance with the method of claim 1.

18. A composition for use in a method for reducing the number of viable organisms present in ship ballast water, said composition comprising iron powder, a suspension agent(s) and a flocculating agent(s).

19. A composition according to claim 18, wherein the suspension agent(s) is/are selected from xanthan gum and polyacrylic acid.

20. A composition according to claim 18, wherein the flocculating agent(s) is alum.

21. A composition for use in a method for reducing the number of viable organisms present in ship water ballast water, said composition comprising:
  20–80% (w/w) iron powder,
  20–80% (w/w) suspension agent(s), and
  5–80% (w/w) flocculating agent(s).

22. A method for reducing the number of viable organisms present in a quantity of sea water comprising adding to said sea water a suitable amount of iron powder so as to reduce the concentration of dissolved oxygen and/or carbon dioxide to a level(s) at which a substantial portion of the organisms present cease to remain viable.

23. A method according to claim 22, wherein at least 70% of the organisms present in the sea water cease to remain viable after said treatment.

24. A method according to claim 22, wherein at least 95% of the organisms present in the sea water cease to remain viable after said treatment.

25. A method according to claim 22, wherein the concentration of dissolved oxygen is reduced to $\leq 5$ mg $l^{-1}$.

26. A method according to claim 22, wherein the concentration of dissolved oxygen is reduced to $\leq 3$ mg $l^{-1}$.

27. A method according to claim 22, wherein the concentration of dissolved carbon dioxide is reduced to $\leq 2$ mg $l^{-1}$.

28. A method according to claim 22, wherein the concentrations of both dissolved oxygen and carbon dioxide is reduced to $\leq 2$ ml $l^{-1}$.

29. A method according to claim 22, wherein the iron powder is added to the sea water in combination with a suspension agent(s).

30. A method according to claim 29, wherein the suspension agent(s) is/are xanthan gum and/or polyacrylic acid.

31. A method according to claim 29, wherein the iron powder and suspension agent(s) are added to the sea water in combination with a flocculating agent(s).

32. A method according to claim 31, wherein the flocculating agent(s) is alum.

33. A method according to claim 22, wherein the iron powder has a particle size in the range of 0.1 $\mu$m to 200 $\mu$m.

34. A method according to claim 22, wherein the iron powder is added to the sea water in amounts greater than 10 grams $m^{-3}$ of sea water.

35. A method according to claim 34, wherein the iron powder is added in amounts greater than 30 grams $m^{-3}$ of sea water.

36. Sea water treated in accordance with the method of claim 22.

37. A method for reducing the number of viable organisms present in ship ballast water comprising adding to said ballast water a suitable amount of an anti-oxidant(s) so as to reduce the concentration of dissolved oxygen and/or carbon dioxide to a level(s) at which a substantial portion of the organisms present cease to remain viable, wherein the concentration of dissolved carbon dioxide is reduced to $\leq 2$ mg $l^{-1}$.

38. A method according to claim 37, wherein the concentrations of both dissolved oxygen and carbon dioxide is reduced to $\leq 2$ mg $l^{-1}$.

39. A method according to claim 37, wherein the anti-oxidant(s) is added to the ballast water in combination with a suspension agent(s).

40. A method according to claim 39, wherein the suspension agent(s) is selected from the group consisting of xanthan gum and polyacrylic acid.

41. A method according to claim 39, wherein the anti-oxidant(s) and suspension agent(s) are added to the ballast water in combination with a flocculating agent(s).

42. A method according to claim 41, wherein the flocculating agent(s) is alum.

43. A method according to claim 37, wherein the anti-oxidant(s) is selected from the group consisting of sulphites, nitrites of metals, chlorites of metals, organic phosphites, organic phosphates and hydroquinones.

44. A method according to claim 37, wherein the anti-oxidant(s) is selected from the group consisting of metal powder(s).

45. Ballast water treated in accordance with the method of claim 37.

46. A method for reducing the number of viable organisms present in a quantity of sea water comprising adding to said sea water a suitable amount of anti-oxidant(s) so as to reduce the concentration of dissolved oxygen and/or carbon dioxide to a level(s) at which a substantial portion of the organisms present cease to remain viable, wherein the concentration of dissolved carbon dioxide is reduced to $\leq 2$ mg $l^{-1}$.

47. A method according to claim 46, wherein the concentrations of both dissolved oxygen and carbon dioxide are reduced to $\leq 2$ ml $l^{-1}$.

48. A method according to claim 46, wherein the anti-oxidant(s) is added to the sea water in combination with a suspension agent(s).

49. A method according to claim 48, wherein the suspension agent(s) is selected from the group consisting of xanthan gum and polyacrylic acid.

50. A method according to claim 48, wherein the anti-oxidant(s) and suspension agent(s) are added to the sea water in combination with a flocculating agent(s).

51. A method according to claim 50, wherein the flocculating agent(s) is alum.

52. A method according to claim 46, wherein the anti-oxidant(s) is selected from the group consisting of sulphites, nitrites of metals, chlorites of metals, organic phosphites, organic phosphates and hydroquinones.

53. A method according to claim 46, wherein the anti-oxidant(s) is selected from the group consisting of metal powder(s).

54. Sea water treated in accordance with the method of claim 46.

* * * * *